United States Patent [19]

Grant

[11] Patent Number: 4,553,695
[45] Date of Patent: Nov. 19, 1985

[54] AUTOMATIC DAMPER MEANS FOR AIR DUCTS

[76] Inventor: Willie T. Grant, 400 S. Simms St., Lakewood, Colo. 80228

[21] Appl. No.: 568,057

[22] Filed: Jan. 4, 1984

[51] Int. Cl.[4] .............................................. F24F 13/10
[52] U.S. Cl. ..................... 236/9 A; 236/51
[58] Field of Search ......................... 236/9 A, 51, 1 G; 251/129

[56] References Cited

U.S. PATENT DOCUMENTS

| | | | |
|---|---|---|---|
| 2,269,036 | 1/1942 | Nessell | 236/9 A X |
| 3,159,212 | 12/1964 | Patrick | 236/1 C X |
| 4,079,884 | 3/1978 | Sherman | 236/1 G |
| 4,138,060 | 2/1979 | Iacono | 236/1 G |
| 4,193,541 | 3/1980 | Scheidweiler | 236/1 G |
| 4,249,883 | 2/1981 | Woolfolk | 236/1 G X |
| 4,273,526 | 6/1981 | Perrelli | 236/1 G X |
| 4,428,558 | 1/1984 | Odogaki et al. | 251/129 X |

Primary Examiner—William E. Tapolcai

[57] ABSTRACT

In dwellings having a multiplicity of rooms that are warmed or cooled by a central heating/cooling device, automatic damper means are incorporated in each duct that transports the heating/cooling medium to said rooms; said damper means control and regulate the flow of said medium and control individual room temperatures in combination with room thermostats. Automatic damper means comprise motor support means attaching to said duct, a damper plate mounted within the duct and rotatable by motor means, said motor means are energized by a room thermostat whenever said thermostat operates a fuel control means of said heating/cooling device.

4 Claims, 17 Drawing Figures

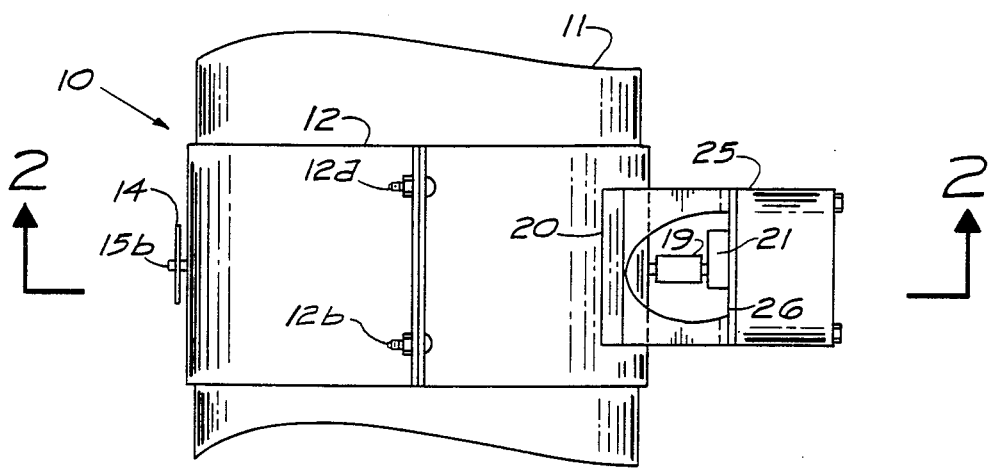
FIG. 1
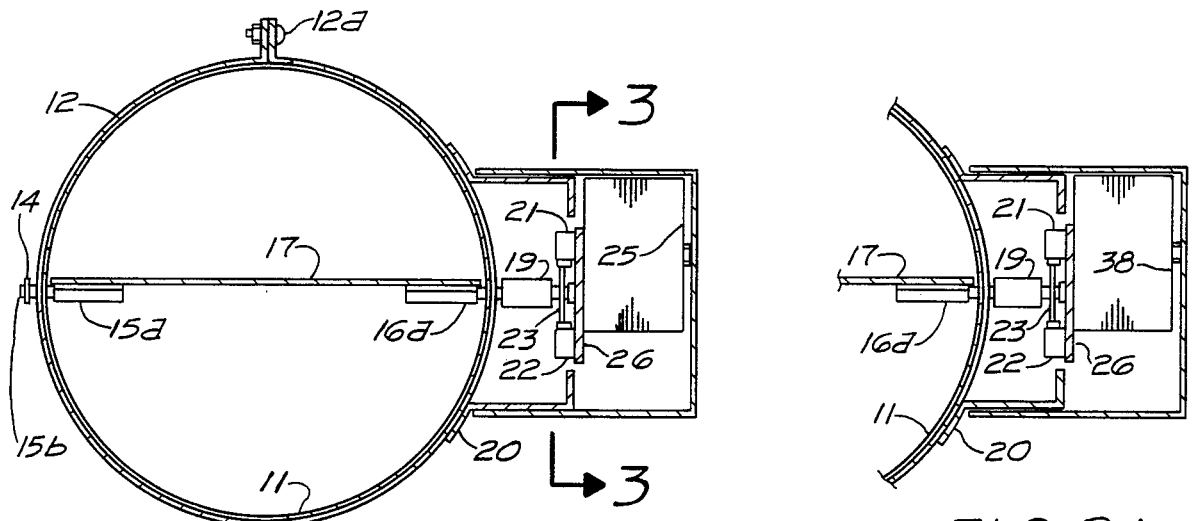
FIG. 2
FIG. 2A
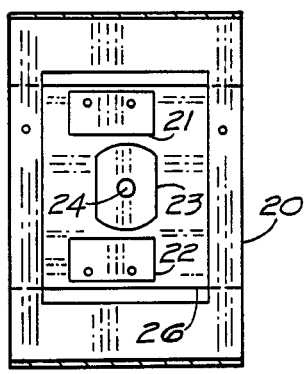
FIG. 3
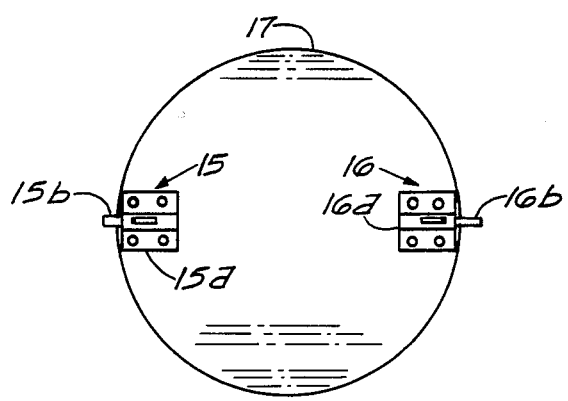
FIG. 4

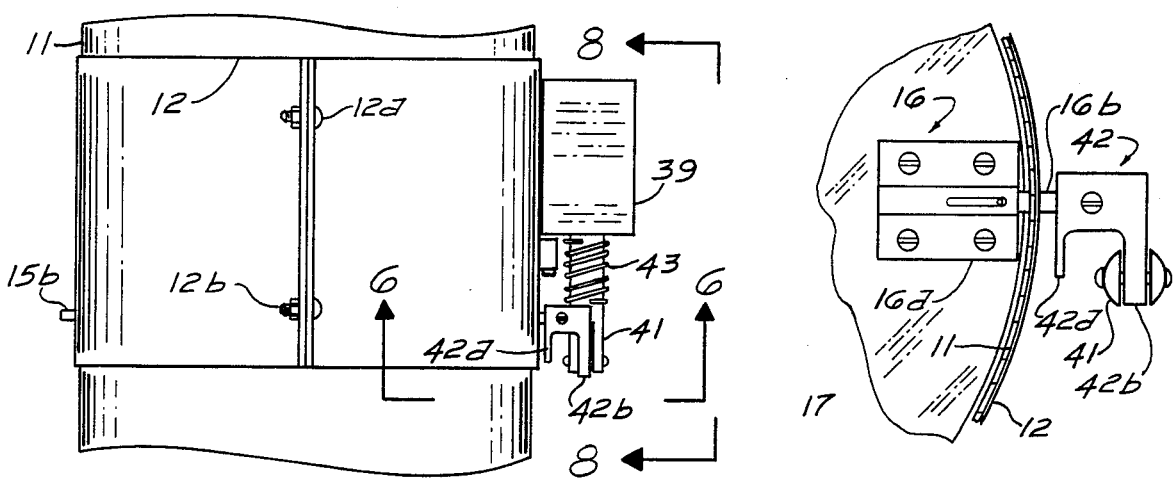
FIG. 5
FIG. 6
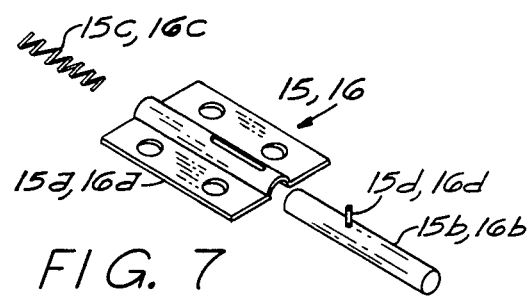
FIG. 7
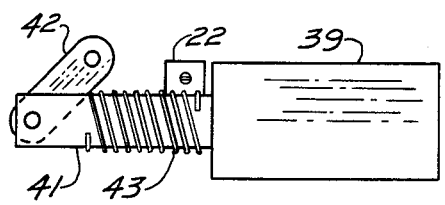
FIG. 8
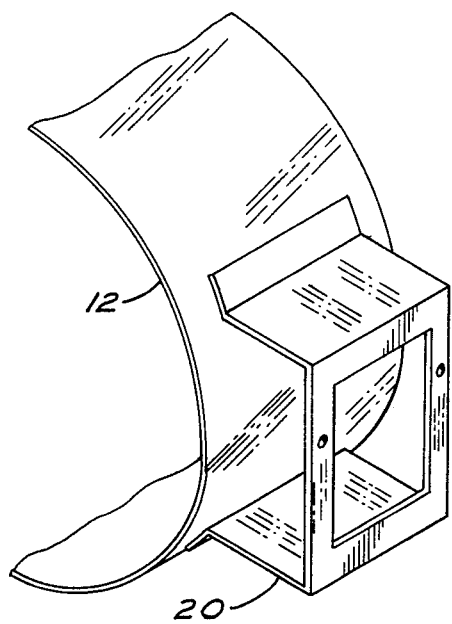
FIG. 9
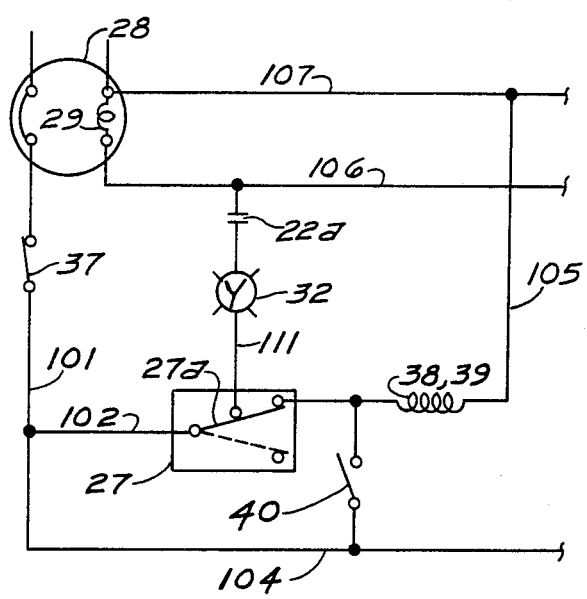
FIG. 10

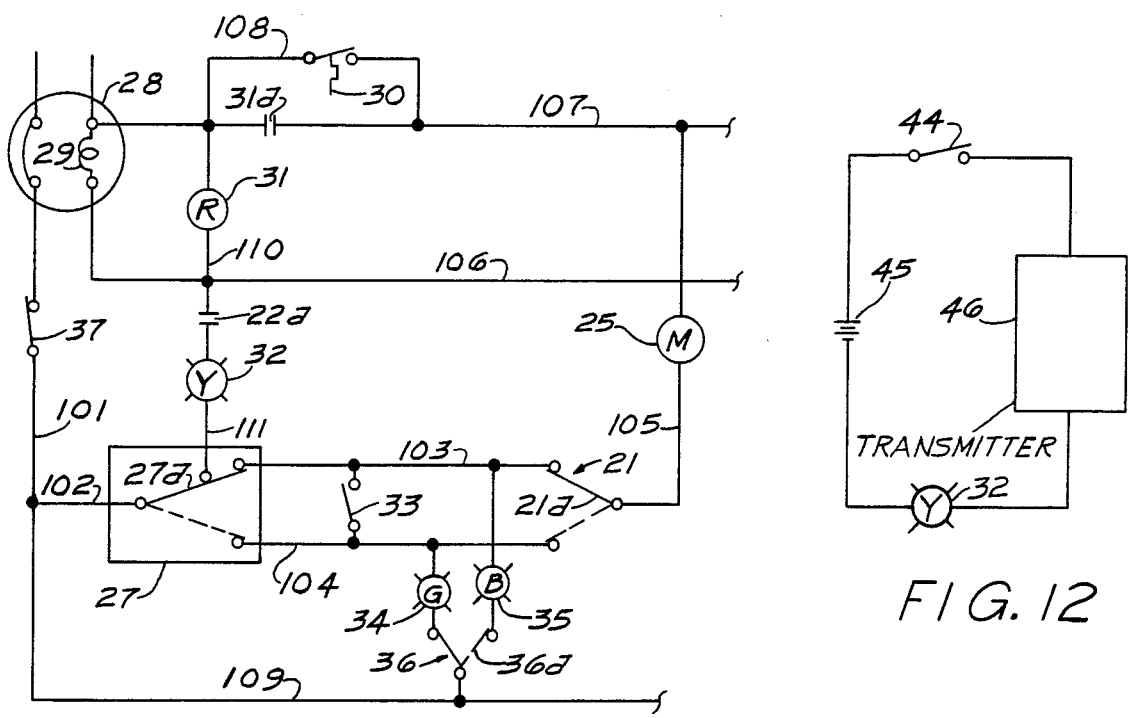
FIG. 11
FIG. 12
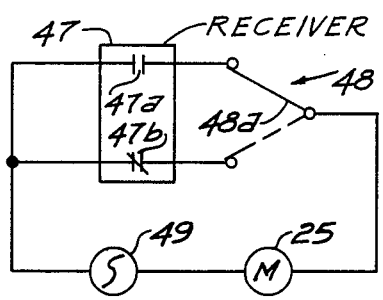
FIG. 13
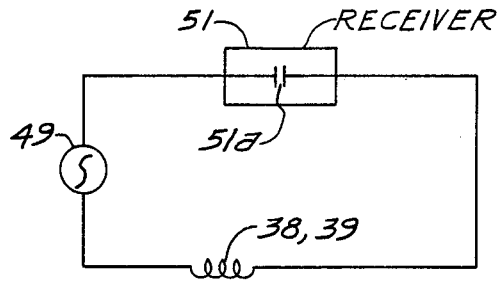
FIG. 14
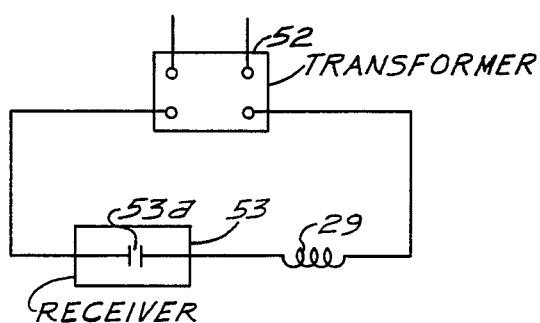
FIG. 15
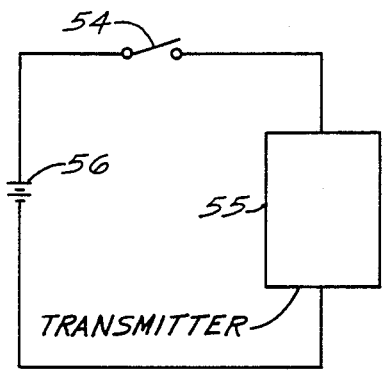
FIG. 16

AUTOMATIC DAMPER MEANS FOR AIR DUCTS

Automatic dampers have been developed as a part of registers mounting in floor, wall, or ceiling openings over the air supply duct terminations. In existing residences where the registers are generally located beneath windows, installation of the wiring connecting the damper motor to a controlling thermostat and the fuel control means can be difficult and costly depending on the nature of construction of the residence and the exact location of the registers.

The present invention incorporates the motorized damper blade within the supply duct leading to the room register. This eliminates some of the difficulties encountered in making the wiring runs from the motor to the thermostat and to the fuel control means and lowers the installation cost.

The automatic damper means include a damper plate having dual supports mounted along a common axis of said damper plate. Each support includes a shaft secured to the damper plate by means of a bracket; each shaft projects beyond the extremities of the damper plate in order to pass through an opening in each side of a duct and support collar; said duct being the enclosure through which the conditioned air flows and through which said air flow is regulated by the damper plate.

The motor means, being either a synchronous motor, rotary solenoid, or linear solenoid, attaches to a collar mounted on the exterior of said duct; said motor means having attachment to one of said support shafts secured to the damper plate. When a room thermostat senses a preset room temperature, the motor means is energized to rotate the damper plate to an open or closed position. If to an open position, the thermostat and motor means cooperate to energize the fuel control means through switch means.

Thermostatic control of the motor means and fuel control means is obtained through either one of two means. In the conventional installation, the room thermostat is hard-wired to both the motor means and the fuel control means. Thus, when the thermostat energizes the motor means and fuel control means, an electrical current travels along conductors to accomplish the energization.

In a remote controlled system, transmitters and receivers send and receive radio frequency (RF) signals which operate the motor means and fuel control means, thereby eliminating a major portion of the interconnecting wiring. When a room thermostat responds to a preset temperature, the thermostatic switch closes, influencing an RF transmitter to send a coded RF signal to energize a receiver connected to the damper means and causing said motor means to be energized and to rotate the damper plate to its open position. As the plate reaches its fully open position, a second transmitter is energized to emit a second RF signal which is intercepted by a second receiver connecting to the fuel control means, said second receiver energizes said fuel control means. When the room thermostat has been satisfied, the thermostatic switch opens to deenergize the first transmitter and receiver, causing the motor means to rotate the damper plate to the closed position, thereby terminating air flow to the room.

A primary object of the present invention is to control air transfer through a duct by automatic damper means.

Another object is to provide automatic damper means that can be installed in existing ducts as well as in new duct installations easily and economically.

These and other objects and advantages of the present invention will become apparent after considering the following detailed specification and drawings wherein:

FIG. 1 is a plan view of automatic damper means;

FIG. 2 is a cross-sectional view taken along line 2—2 of FIG. 1;

FIG. 2A is a cross-sectional view similar to FIG. 2 but showing an alternate drive means for the damper means;

FIG. 3 is sectional view taken along line 3—3 of FIG. 2;

FIG. 4 is a plan view of a damper plate and its supports;

FIG. 5 is a plan view of alternate automatic damper means;

FIG. 6 is a partial section taken along line 6—6 of FIG. 5;

FIG. 7 is an isometric view of the damper plate support;

FIG. 8 is an elevational view taken along line 8—8 of FIG. 5;

FIG. 9 is a partial isometric view of motor support bracket and collar;

FIG. 10 is a schematic circuit diagram for automatic damper means having rotary or linear solenoid motor means;

FIG. 11 is a schematic circuit diagram for automatic damper means having synchronous motor means wired to thermostatic means and fuel control means;

FIG. 12 is a schematic circuit for a thermostatically operated RF transmitter;

FIG. 13 is a schematic circuit for a remote controlled synchronous motor;

FIG. 14 is a schematic circuit for remote controlled solenoids;

FIG. 15 is a schematic circuit for remotely operated fuel control means;

FIG. 16 is a schematic circuit for an RF transmitter operated by motor means.

Referring to the drawings more specifically by reference numbers, the number 10 in FIG. 1 refers to an automatic damper device. The device 10 includes a collar 12 (FIGS. 1, 2, and 9) constructed to contain a duct 11, a damper plate 17 having support means 15 and 16 (FIGS. 2, 4, and 7) attached along an axis of said damper plate 17, a motor support bracket 20 attached to said collar 12, and motor means 25 having attachment to said bracket 20; said motor means having a shaft 24 (FIG. 3) coupled to shaft 16b of damper shaft support 16 through coupling 19 in order to rotate said damper plate 17 when said motor means is energized. The motor shaft 24 (FIG. 3) secures cam 23 which operates motor control switch 21 and fuel control means switch 22, said switches being attached to switch support plate 26 mounted on the face of motor 25.

In the installation of device 10 on a new or existing duct 11, fasteners 12a and 12b are released to provide clearance for duct 11 to be inserted into collar 12, after which said fasteners are tightened to hold the collar securely in place. Holes are drilled in each side of duct 11, using predrilled guide holes in collar 12; said holes accept damper support members 15b and 16b when damper plate 17 is mounted internal to said duct 11. As shown in FIG. 7 springs 15c and 16c permit members 15b and 16b to accommodate the installation of damper plate 17 within duct 11. When plate 17 is in the proper position, said springs force members 15b and 16b into the aforesaid holes.

Turning to FIG. 11 where it can be seen that when a temperature adjustment is required, thermostatic switch 27a is moved to the solid line position to energize motor means 25 through conductor 103, switch lever 21a in the solid line position, conductors 105 and 107, high temperature thermostat 30 and conductor 108 and part of 107. As motor means 25 rotates damper plate 17 to the open position, cam 23 moves switch lever 21a to the dashed line position and closes contacts 22a of switch 22. The closing of contacts 22a energizes solenoid 29 of fuel control means 28, placing the heating/cooling device in an operational mode; said contact closure permits relay 31 to be energized to close internal contacts 31a. When the heating/cooling device is in a heating mode, thermostat 30 opens at a specified temperature and remains open until the operating cycle ceases and the internal temperature decreases; relay 31 is also deenergized when room thermostat 27 is satisfied and thermostatic switch 27a moves to the dashed line position and contacts 31a open. Opening of said contacts and said thermostat 30 leaves damper plate 17 in an open position, permitting conditioned air to be blown into the room for the duration of the blower cycle of the heating cooling device. As the temperature in said device decreases, thermostat 30 closes allowing damper plate 17 to be closed by motor means 25; said motor means being energized through the dashed line position of thermostatic switch 27a, conductor 104, dashed line position of switch lever 21a, conductors 105 and 107, thermostat 30, and conductor 108.

To prevent deenergization of motor means 25 when damper blade 17 is partially open and the position of thermostat lever 27a is prematurely changed, holdin switch 33, shown in FIG. 11, is incorporated into the circuit to be operated by a cam similar to cam 23 shown in FIG. 2. Switch 33 is held in a closed position by said cam until damper plate 17 is either fully opened or fully closed.

Manually operated switch 37 provides a means to electrically disengage all damper circuits from the central heating/cooling device, while manually operated switch 36 allows motor means 25 to be operated independently of thermostat 27 to open or close damper plate 17.

Light means 32, being an indicator light, visibly shows when a room thermostat is energizing the fuel control solenoid 29; and lights 34 and 35 indicate the open or closed position of damper plate 17 when motor means 25 is being controlled by three-way manual switch 36.

A first alternate means for operating damper plate 17 is by means of rotary solenoid 38 (FIG. 2A), said solenoid attaching to damper plate 17, bracket 20 and collar 12; said bracket and collar, in combination, circumferentially engaging duct 11. Solenoid 38, upon being energized, rotates damper plate 17 through a quarter of a revolution, and returns said damper plate through the same arc upon being deenergized. Schematic diagram in FIG. 10 shows that rotary solenoid 38 and light means 32 are energized through the solid line position of thermostatic switch 27a and deenergized when said switch is in the dashed line position. Operation of the heating-/cooling device is restricted until damper plate 17 is in the fully open position allowing switch 22 (FIG. 3) to close contacts 22a. Manually operated switch 40 bypasses thermostat 27 permitting solenoid 38 to be operated independently of said thermostat.

A second alternate motor means shown in FIGS. 5 and 8 incorporates a linear solenoid 39 having plunger 41 connected to damper 17 by pivot means 42, said pivot means combines a pivot arm 42b connecting to plunger 41 and a switch operator 42a which operates switch 22. When solenoid 39 is energized by thermostat 27 (FIG. 10), plunger 41 is pulled into solenoid 39, closing damper plate 17 and contacts 22a of switch 22. After thermostat 27 has been satisfied and lever 27a moved to the dashed line position, said solenoid is deenergized and plunger 41 returned to its extended position by spring 43, thereby closing damper plate 17. Manual switches 37 and 40 and light means 32 function as heretofore described.

The foregoing description of the operation of the automatic damper means was based on all electrical components having interconnections through means of conductors. The following description provides for operation of the damper means by remote control using radio frequency (RF) signals.

Thermostat 44 of FIG. 12 functions as an on-off switch between electrical source 45 and RF transmitter 46. When a given room requires a temperature adjustment, thermostat 44 closes to energize transmitter 46 and indicator lights 32; said transmitter sends an RF signal to receiver 47 (FIG. 13) for those damper means operated by synchronous motor means 25, and to receiver 51 for those damper means operated by solenoid means 38 or 39.

Looking first at FIG. 13 and the damper means operated by motor means 25, receiver 47 intercepts the coded signals from transmitter 46 and contacts 47a close to energize motor means 25 through the solid line position of switch lever 48a; said motor rotating damper plate 17 (FIG. 2) to the open position. As damper blade 17 opens, switch 54 of FIG. 16 is closed by a switch operator (not shown) to energize transmitter 55, said transmitter sending an RF signal to receiver 53, thereby closing contacts 53a and energizing solenoid 29 of the fuel control means. When thermostat 44 has been satisfied, said thermostat opens to deenergize transmitter 46, which simultaneously deenergizes receiver 47. However, as a result of switch lever 48a having been previously moved to the dashed line position by cam 23, motor means 25 is currently energized through normally closed contacts 47b and said dashed line position of switch lever 48a and rotates damper plate 17 to its closed position. Simultaneously switch 54 of FIG. 16 opens to deenergize transmitter 55 and contacts 53a open to deenergize solenoid 29.

Rotary solenoid 38 or linear solenoid 39 of FIG. 14 is energized when receiver 51 intercepts an RF signal from a compatible transmitter 46 of FIG. 12; contacts 51a close to energize solenoid 38 or 39, thereby rotating damper plate 17 to an open position as previously described. Simultaneously switch 54 of FIG. 16 is closed to energize transmitter 55 which causes solenoid 29 of FIG. 15 to place the heating/cooling device in an operational mode. When thermostat 44 is satisfied and opens, the heating/cooling device cycle is terminated as heretofore explained for motor means 25.

In the foregoing discussion, transmitter 55 prevents a combustion cycle from occurring within the heating-/cooling device until damper plate 17 is in a fully open position. An alternate method of operation uses a singular transmitter 46 coded to energize either receiver 47 or 51 simultaneously with receiver 53. Such an operation eliminates the requirement for transmitter 55 and the circuit of FIG. 16. Fuel control device 29, therefore, energizes simultaneously with motor means prior to opening of damper plate 17.

There has been set forth a new and novel invention to automatically and economically control and regulate the air flow into any one or combination of rooms and thereby independently control the temperature in each one of a multiplicity of rooms. Many changes, modifications, variations and other uses and applications will become apparent to those skilled in the art after considering this specification and the accompanying drawings. All such changes, mocifications, variations, and other uses and applications which do not depart from the spirit and scope of the invention are deemed to be covered by the invention which is limited only by the claims which follow:

I claim:

1. Automatic damper means having rotatable damper means controlling and regulating the flow of a heating-/cooling medium through duct means, said duct means being part of a central heating/cooling system of a residence or like structure; said duct means transporting said heating/cooling medium to a plurality of rooms or zones of said residence or like structure; said heating-/cooling means being energized concurrently with said automatic damper means by a plurality of thermostatic means; said automatic damper means comprising:
    (a) operating means, said operating means having motor means and switch means; said motor means having external shaft means engaging switch operating means and said damper means; said switch means comprising a first manual switch interconnecting said fuel control means with a plurality of said thermostatic means; a second manual switch bypassing said thermostatic means and energizing said motor means independently of said thermostatic means; an automatic hold-in switch interconnecting said thermostatic means and said motor means, preventing said motor means from deenergizing until said damper means has reached a fully open or closed position when said motor means are being controlled by said thermostatic means, a second automatic switch interconnecting said thermostatic means and said motor means, said second automatic switch controlling said motor means in response to said thermostatic means; said switch operating means actuating said hold-in switch and said second automatic switch;
    (b) support means, said support means comprising engaging means, said engaging means occupying a circumferential position about a portion of said duct means, said engaging means having bracket means attaching thereto; said engaging means supporting said damper means and said bracket means; said bracket means supportedly engaging said automatic switch means and said motor means;
    (c) control means, said control means comprising said thermostatic means providing an electrical interlock between said fuel control means, said switch means and said motor means; said motor means operating said damper means; relay means and high temperature thermostatic means, said relay means and high temperature thermostatic means electrically interconnecting said fuel control means and motor means to maintain a last operable damper means in an open position after said fuel control means deenergizes; indicating means electrically interconnecting said thermostatic means, said motor means, said relay mean, and said fuel control means, said indicating means communicating a current operation 21 status of said damper means and said fuel control means.

2. Automatic damper means having rotatable damper means controlling and regulating the flow of a heating-/cooling medium through duct means, said duct means being part of a central heating/cooling system of a residence or like structure; said duct means transporting said heating/cooling medium to a plurality of rooms or zones of said residence or like structure; said heating-/cooling means being energized concurrently with said automatic damper means by a plurality of thermostatic means; said automatic damper means comprising:
    (a) operating means, said operating means having rotary solenoid motor means and switch means; said motor means having external shaft means engaging switch operating means and said damper means; said switch means comprising a first manual switch interconnecting said fuel control means with a plurality of said thermostatic means; a second manual switch bypassing said thermostatic means and energizing said motor means independently of said thermostatic means; an automatic switch operable by said damper means, preventing fuel control means from energizing until said damper means are in an open position;
    (b) support means, said support means comprising engaging means, said engaging means occupying a circumferential position about a portion of said duct means, said engaging means having bracket means attaching thereto; said engaging means supporting said damper means and said bracket means; said bracket means supportedly engaging said automatic switch means and said motor means;
    (c) control means, said control means comprising said thermostatic means providing an electrical interlock between said fuel control means, said switch means and said motor means; said motor means rotating said damper means from a closed to an open position; indicating means electrically interconnecting said thermostatic means, said fuel control means, and said motor means and communicating the present operational status of said fuel control means and said damper means.

3. Automatic damper means having rotatable damper means controlling and regulating the flow of a heating-/cooling medium through duct means, said duct means being part of a central heating/cooling system of a residence or like structure; said duct means transporting said heating/cooling medium to a plurality of rooms or zones of said residence or like structure; said heating-/cooling means being energized concurrently with said automatic damper means by a plurality of thermostatic means; said automatic damper means comprising:
    (a) operating means, said operating means having linear solenoid means and switch means; said linear solenoid means comprising motor means having external plunger means engaging switch operating means and said damper means; said switch means comprising a first manual switch interconnecting said fuel control means with a plurality of said thermostatic means; a second manual switch bypassing said thermostatic means and energizing said motor means independently of said thermostatic means; an automatic switch operable by said damper means, preventing fuel control means from energizing until said damper means are in an open position;

(b) support means, said support means comprising engaging means, said engaging means occupying a circumferential position about a portion of said duct means, said engaging means having bracket means attaching thereto; said engaging means supporting said damper means and said bracket means; said bracket means supportedly engaging said automatic switch means and said motor means;

(c) control means, said control means comprising said thermostatic means providing an electrical interlock between said fuel control means, said switch means and said motor means; said motor means rotating said damper means from a closed to an open position; indicating means electrically interconnecting said thermostatic means, said fuel control means, and said motor means and communicating the present operational status of said fuel control means and said damper means.

4. The means defined in claims 1 or 2 or 3 wherein said damper means being rotatably mounted internal to said duct means of said heating/cooling device and controlling and regulating the flow of said heating/cooling medium transporting through said duct means to a plurality of rooms or zones and having engagement with and operated by said motor means; said motor means supportedly attaching to said bracket means of said engaging means; said engaging means being circumferential about a portion of said duct means; said motor means having attachment to said engaging means, in combination with said fuel control means, being operable by remote control means, said remote control means being thermostatically operable by coded transmitter means, said transmitter means sending coded signals to remotely located receiver means, said receiver means being energized by said coded signals and electrically operating said fuel control means and said motor means, said motor means subsequently operating said damper means mounting in said duct means.

* * * * *